Nov. 17, 1942.  W. F. ALLER  2,302,090
GAUGING DEVICE
Filed Nov. 12, 1941  2 Sheets-Sheet 1
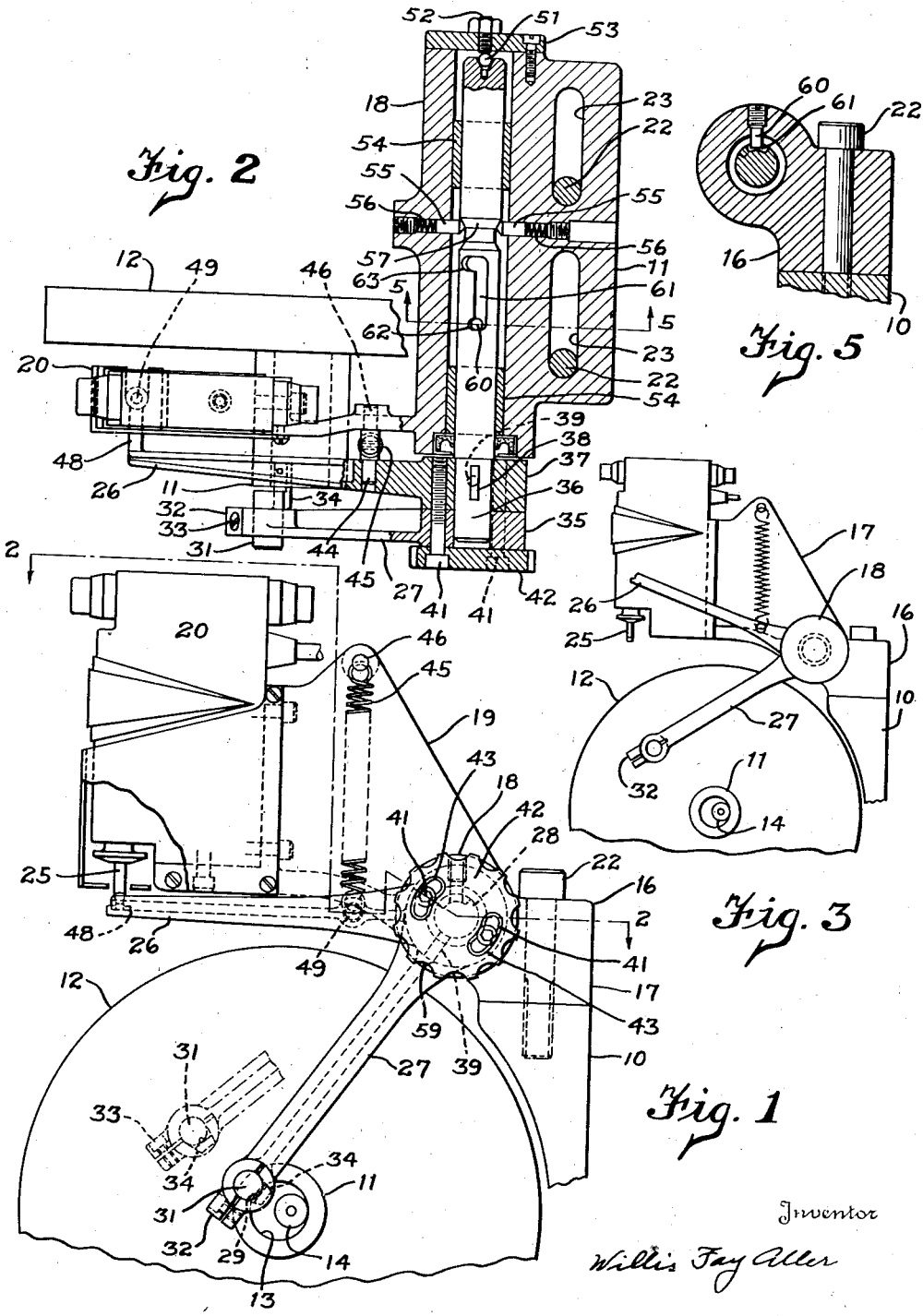

Nov. 17, 1942.        W. F. ALLER              2,302,090
                      GAUGING DEVICE
              Filed Nov. 12, 1941         2 Sheets-Sheet 2
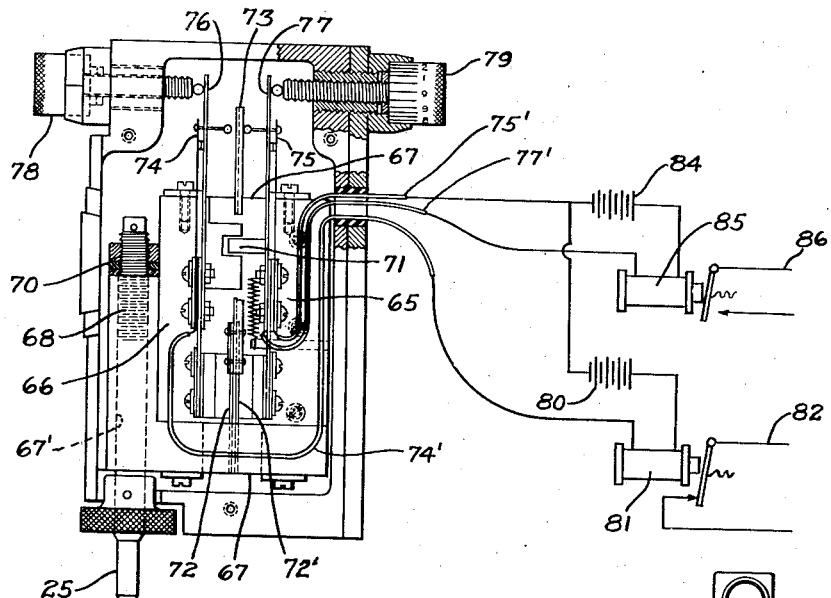
Fig. 6
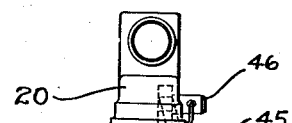
Fig. 4
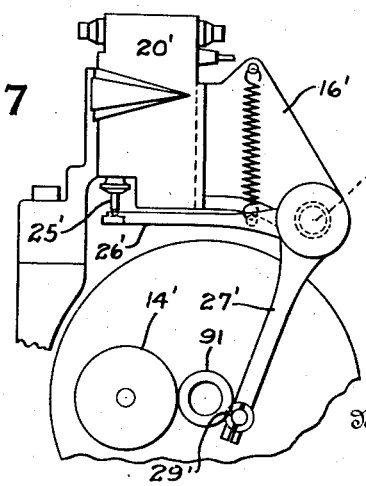
Fig. 7
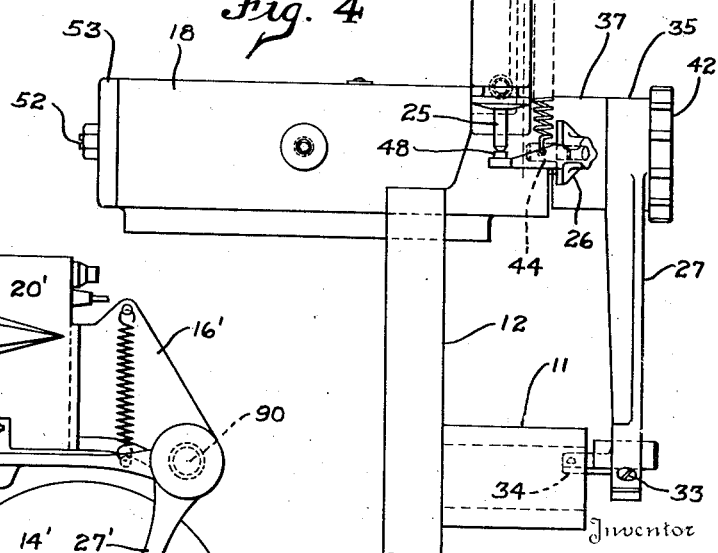
Inventor
Willis Fay Aller
By Maréchal & Noz
Attorneys Patented Nov. 17, 1942

2,302,090

UNITED STATES PATENT OFFICE 2,302,090

GAUGING DEVICE

Willis Fay Aller, Dayton, Ohio, assignor to The Sheffield Corporation, Dayton, Ohio, a corporation of Ohio Application November 12, 1941, Serial No. 418,746

13 Claims. (Cl. 33—172)

This invention relates to gauging apparatus for accurately determining a dimension of a workpiece, such as the diameter of a surface of revolution of a rotating workpiece.

One object of the invention is the provision of a gauging apparatus of the character mentioned, in which the gauging mechanism is mounted in a location which is fixed with respect to the work axis, and providing a readily adjustable and simple apparatus adjustable to accommodate different workpiece diameters, for transmitting the movements of a work engaging feeler to the gauging mechanism.

Another object of the invention is the provision of a gauging device including a gauge housing fixed to a stationary support having a definite positioning with respect to the work axis, and motion transmitting means including a plurality of relatively adjustable arms pivotally mounted on the support and adapted respectively to engage the rotating work and a gauge operating member which operates the gauging mechanism, the construction being such that the arms can be readily moved between operative and inoperative positions.

Another object is the provision of a gauging apparatus including gauging mechanism arranged in a desired location and operated by a pivoted work engaging arm which can be bodily moved to an inoperative position in which it is free of the work and the gauging mechanism.

Another object of the invention is the provision of a grinding machine for grinding a rotatable workpiece and having a support mounted in fixed position with respect to the work axis and provided with a gauge controlling part, a motion transmitting assemblage of parts, readily adjustable to accommodate different workpiece diameters, being pivotally mounted on the support for movement about an axis parallel to the work axis to transmit the movements of a work engaging feeler portion for the control of the gauging part in the support.

Other objects and advantages of the invention will be apparent from the following description, the appended claims and the accompanying drawings.

In the drawings,

Fig. 1 is a side elevation of a gauging apparatus embodying the present invention;

Fig. 2 is a horizontal section on the line 2—2 of Fig. 1;

Fig. 3 is a view corresponding to Fig. 1 but on a reduced scale and showing the motion transmitting arms moved to an inoperative position;

Fig. 4 is a front elevation of the gauging apparatus;

Fig. 5 is a section on the line 5—5 of Fig. 2;

Fig. 6 is a side elevation of the gauging mechanism with the front plate of the gauge housing removed and showing electric circuits controlled by the gauging mechanism; and Fig. 7 is a side elevation of a gauging apparatus for gauging an external surface on a workpiece.

Referring more particularly to the drawings, in which the preferred embodiment of the invention has been illustrated, 10 designates a portion of the frame structure of a grinding machine adapted to grind a surface of revolution on a rotating workpiece 11. The workpiece is centered and rotated by a suitable head stock 12 which is connected to the frame 10 so that the latter has a fixed relation with respect to the work axis. As shown in Fig. 1, the internal surface 13 of the workpiece is ground by a rotatable grinding wheel 14. Suitable means are provided to rotate the grinding wheel 14 on its own axis, and to produce a feeding movement of the grinding wheel with respect to and transversely of the work axis to enlarge and finish the surface 13.

Fixed on the frame structure 10 is a support 16, including a mounting bracket portion 17, a body portion 18, a web portion 19 and a gauge housing 20. Screws 22 extend through slots 23 in the mounting bracket portion and secure the latter rigidly to the frame structure 10 near the workpiece. The web portion 19 extends towards the operator's position from the body portion 18, the housing 20 thus being located some distance above the workpiece.

The housing 20 contains suitable gauging mechanism responsive to the vertical movements of a gauge operating member 25 which projects through the bottom wall of the housing 20 and which has a lower limiting position determined by the gauge mechanism, as will be presently described. This gauge operating member 25 is operated by a gauge operating arm 26 which moves with a feeler arm 27, both arms being pivotally supported for movement about an axis 28 which extends parallel to the work axis. The feeler arm 27 has a work engaging stud 29 which is held in contact with the surface of the work as the surface is ground to a desired size. The pivot axis 28 of the arm 27 is so located that the work engaging stud 29 moves in a direction towards and from the work axis and preferably in an arc which intersects the work axis.

The work engaging stud 29 as shown in Figs. 1 to 4 is provided at the end of a lateral extension of arm 27, the extension preferably being in the form of a rod 31 fitting within a split clamp 32 formed at the outer end of the arm 27. This clamp is of such construction that the rod 31 can be moved in the direction of its axis and held in any desired position by a clamp bolt 33 which tightens the ends of the split clamp and thus fixes the lateral extension securely to the end of the arm. The end of the rod has an offset work-entering projection 34 which extends into the work so that the work-contacting stud 29 is brought against the surface being ground without interfering with the required operation of the grinding wheel in a grinding operation.

The hub portion 35 of arm 27 is rotatably carried by a shaft 36 which is rotatably and axially movable in the body portion 18 of the support. This hub portion 35 is arranged at the side of the hub portion 37 of the gauge operating arm 26, the hub portion 37 being secured against rotation on the shaft by a key 38 and held against axial movement with respect to the shaft by means of a set screw 39 threaded in the hub portion and engaging the shaft. The hub portion 35, which is rotatably adjustable on the shaft 36, is fixed in an adjustable manner to the hub 37 by means of screws 41 extending through an end plate 42, through segmental slots 43 in hub 35 and threaded in tapped holes in the hub 37. The segmental slots 43 permit the relative angle between the arms 26 and 27 to be varied to accommodate workpiece diameters of different size without changing the operative position of the arm 26 with respect to the gauge mechanism. To relatively adjust the arms 27 and 26 to accommodate a workpiece surface that is of larger diameter than the surface 13 shown in Fig. 1, the screws 41 are loosened, the arm 26 is held so that it is spaced a small distance from the gauge operating member 25, and the arm 27 is then moved clockwise until the work engaging stud 29 is brought into engagement with the work, thus decreasing the angle between the arms 26 and 27. The screws 41 are then tightened so that the two arms 26 and 27 are securely fixed together and any movement of the work engaging stud 29 will then be proportionately reproduced at the outer end of the arm 26 as the stud moves with an increase in the work diameter during grinding.

The arm 26 is provided with a pin 44, attached to the lower end of a spring 45 the upper end of which is held by a pin 46 in the web 19. The spring acts to yieldingly urge the arms 26 and 27 in a clockwise direction and thus hold the work engaging stud 29 against the work in a yielding manner. This yieldingly urges the outer end of the arm 26 up towards the gauge operating member 25. The arms 26 and 27 are preferably so set that before the grinding operation starts on the surface 13, the work engaging stud 29 will be located by the work and by the spring 45 in such position that there is a small clearance space between the lower end of the gauge operating member 25 and the outer end of the arm 26. After the grinding operation results in some increase in the work diameter, the end of the arm 26 will be brought into contact with the member 25, which up to that time is held in its lower limiting position, and then as the work is further ground the member 25 will move upwardly in accordance with the increase in the work diameter.

The outer end of the arm 26, as will be apparent from Figs. 1 and 2, is laterally offset to provide an extension portion 48 extending in the same direction from the arm 26 in which the rod 31 projects from the arm 27. The end of this extension 48 has a hardened portion 49 which operates against the lower end of member 25. It should also be noted that the member 25 moves in a direction which is substantially tangential to the movement of the outer end of the arm 26 regardless of the angularity between the arms 26 and 27.

The shaft 36 is axially movable to move the arms 26 and 27 out of their operative positions. The normal position of the shaft, as shown in Fig. 2, is determined by limiting means such as a ball 51 retained on the end of the shaft and engaging the end of an adjustable screw 52 which is threaded in the end plate 53. The latter closes the cylindrical passage in the body portion 18 in which the shaft is arranged. Bushings 54, as shown, are provided between the shaft and the body portion of the housing and accurately center the shaft and permit it to move rotationally and axially. Normally the shaft is held so that it presses, through the ball 51, against the adjustable stop screw 52 by means of spring pressed camming plungers 55 urged inwardly by springs 56 against an inclined cam surface 57 on the shaft. The pressure of the plungers 55 may be readily overcome by a manual pull on the shaft, which may be exerted on the arms or on the end plate 42 to which the arms are secured. The end plate 42 may be roughened, or scalloped as indicated at 59 so that it may be readily moved under the manual control of the operator. When a pull is exerted on the end plate 42, the shaft is pulled outwardly, bringing the extension 48 of the arm 26 out from under the gauge housing and also bringing the work engaging stud and the projection 34 on which it is mounted out from the workpiece.

The distance through which the shaft may be moved in an axial direction is limited by a stop pin 60 fixed in the body member 18 and projecting into a slot 61 in the shaft. At the ends of this slot, as will be apparent from Fig. 2, are lateral slot enlargements 62 and 63. When the arm 26 is in operative engagement with the member 25 the shaft is in such position that free rotational movements are permitted under the control of arm 27, but the pin 60 is partly entered in the slot extension 62 restraining the shaft against endwise movement until the shaft is rotated far enough in a counterclockwise direction as viewed in Fig. 1 to bring the pin 60 substantially into line with the longitudinally extending portion of slot 61, thus insuring movement of the arm 26 out of engagement with the operating member 25 by initially rotating that arm, and insuring movement of the work engaging stud 29 rotationally away from the workpiece before the arms are moved out in a direction parallel to the work axis. The arms may then be moved axially through a substantial distance, and after the extension of the arm 27 is entirely clear of the work, both arms may be simultaneously rotated in a clockwise direction beyond their normal operative positions, bringing the outer end of the arm 26 up alongside of the gauge housing and bringing the lower end of the feeler arm 27 up above the level of the work to permit a new workpiece to be applied to the grinding machine. Fig. 3 shows the arms swung clockwise into this inoperative position, the arms being swung clockwise until the slot extension 63 is pulled up against the pin 60 by the spring 45. Attention is called to the fact that the arms are movable to inoperative positions with respect to the gauge housing and with respect to the work while the gauge housing remains securely held in fixed position relative to the work axis. As the housing is firmly secured, the gauge mechanism which it contains will not be subjected to inaccuracies due to looseness of mounting produced by articulated joints or for other reasons.

The gauging mechanism which is carried by the support 16, in the housing 20 of that support, may be of the construction disclosed in Patent 2,254,313 dated September 2, 1941. In the housing 20 is a fixed block 65, cooperating with a movable block 66 which is connected to the fixed block by flexible flat spring blades 67 which mount the movable block 66 for vertical movement as viewed in Fig. 6. The block 66 has a threaded passage as indicated at 67', and adjustably receives the threaded stem 68 of the gauge operating member 25. Suitable tensioning means holds the stem 68 in a desired position in the movable block, and cooperating stops 70 and 71 on the blocks 66 determine the lowermost position to which the block 66 can be moved.

Fixed to the respective blocks are two parallel closely adjacent spring reeds 72 and 72' which control the swinging movements of a finger 73 attached to the upper ends of the two reeds. This finger controls electric circuits which are completed through flexible contact strips 74 and 75 cooperating respectively with contact blades 76 and 77. The position of these blades 76 and 77 can be adjusted by turning the adjustment dials 78 and 79 respectively. The finger 73 bears against an insulated pin on the flexible contact 74 when the member 25 is in its lowermost position, thus holding open a circuit connected between contacts 74 and 76, wire 74' and a wire 77' common to both contact strips 74 and 77, a suitable current source 80 and a relay 81 which controls a second circuit 82. This circuit 82, when closed, may operate a solenoid valve to stop the flow of coolant water which is supplied during the grinding operation to keep the work cool, and also, through suitable electrical controlling apparatus, automatically stops the feed of the grinding wheel into the work, these operations taking place when the finger 73 moves clockwise far enough to release itself from the insulated stud on contact 74 and permit contact 74 to close with blade 76. The arms 26 and 27 are so positioned that this takes place when the work has been ground to within a few thousandths of an inch from the desired size. The rotational movement of the grinding wheel continues and there is sufficient contact between the grinding wheel and the work even though there is no relative feed of the grinding wheel into the work, to provide a finishing cut sufficient to take off the remaining few thousandths of an inch. As soon as the work reaches the right size, the circuit is opened between contacts 75 and 77 through wires 75', 77', a source of current 84 and a relay 85 which controls a circuit 86, the adjusting knob 79 being so positioned that the contacts 75 and 77 will open when the surface of the work against which the stud 29 engages is exactly the right size. The circuit 86 preferably includes a suitable electrical apparatus which reverses the direction of feed of the grinding wheel when this circuit 86 is energized so that the grinding wheel will be promptly moved radially away from the work far enough to completely stop the grinding operation. After the completion of the grinding operation, the grinder is removed laterally from within the work and the arms 26 and 27 are simultaneously moved, first to some extent in a rotational manner in an anticlockwise direction and then in a direction parallel to the work axis to separate the outer ends of these arms from the gauge operating mechanism and from the work.

Where the gauging apparatus is for measuring an external surface of revolution on a workpiece, the arms are arranged, as shown in Fig. 7, so that the pivot axis 90 of the arms 26' and 27' is on the opposite side of the work 91 from the grinding wheel 14'; the gauge housing 20' carried by the support 16' being located substantially above the work position. The work engaging stud 29' on the lower end of the arm 27' is movable in a direction which is upwardly and in a direction towards the work axis as the outer surface on the workpiece 91 is cut by the grinder, and as the arm 27' moves clockwise during the grinding operation, the arm 26' moves towards the gauge operating member 25'. In this form of construction the gauge operating mechanism and the mounting of the feeler arm and the gauge operating arm is similar in construction to the arrangement illustrated in Figs. 1 to 5 except for the differences in the mounting arrangement as above mentioned.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device of the character described for gauging a rotating workpiece, comprising a support adapted for mounting in a position which is fixed with respect to the work axis, a feeler arm operably mounted on said support and having a work engaging portion for yieldingly engaging the work, a gauge operating arm, means adjustably fixing the feeler arm to the gauge operating arm to accommodate different workpiece diameters, a gauging mechanism carried by said support including a gauge operating member operated by said gauge operating arm, and means for mounting said arms on said support for movement in a direction parallel to the work axis to separate the gauge operating arm from the gauge operating member.

2. A device of the character described for gauging a rotating workpiece, comprising a support, a feeler arm having a work engaging portion adjacent one end thereof for yieldingly engaging the work and pivotally movable on said support about an axis parallel to the work axis and so spaced from the work axis that the work engaging portion of the arm moves in a generally radial direction in an arc which substantially meets the work axis, a gauge operating arm, means adjustably fixing the feeler arm to the gauge operating arm to change the relative angularity of such arms, a gauging mechanism carried by said support including a gauge operating member operated by said gauge operating arm, and means for mounting said arms on said support for axial and pivotal movement.

3. A device of the character described for gauging a rotating workpiece, comprising a support adapted for mounting in a position which is fixed with respect to the work axis, a feeler arm having a work engaging portion adjacent one end thereof for yieldingly engaging the work, means pivotally mounting said arm on said support for movement about an axis parallel to the work axis and so spaced from the work axis that the work engaging portion of the arm moves in a generally radial direction in an arc which substantially meets the work axis, a gauge operating arm, means adjustably fixing the feeler arm to the gauge operating arm to change the relative angularity of such arms, a gauging mechanism carried by said support including a gauge operating member operated by said gauge operating arm, and means for swinging said arms to remove the feeler arm from the work and simultaneously remove the gauge operating arm from the gauge operating member.

4. A device of the character described for gauging a rotating workpiece, comprising a support adapted for mounting in a position which is fixed with respect to the work axis, said support including a fixed gauge housing containing gauging mechanism, a feeler arm having a work engaging portion adjacent one end thereof for yieldingly engaging the work, means pivotally mounting said arm on said support for movement about an axis parallel to the work axis and so spaced from the work axis that the work engaging portion of the arm moves in a generally radial direction in an arc which substantially meets the work axis, a gauge operating arm, means adjustably fixing the feeler arm to the gauge operating arm to accommodate workpieces of different diameter, a gauge operating member operated by said gauge operating arm and operating said gauging mechanism, and means for swinging said arms to remove the feeler arm from the work and simultaneously remove the gauge operating arm from the gauge operating member.

5. A device of the character described for gauging a rotating workpiece, comprising a support adapted for mounting in a position which is fixed with respect to the work axis, a feeler arm having a work engaging portion adjacent one end thereof, means yieldingly holding said portion in engagement with the work, a shaft pivotally mounted on said support and carrying said arm for movement about an axis parallel to the work axis and so spaced from the work axis that the work engaging portion of the arm moves in a generally radial direction in an arc which substantially meets the work axis, a gauge operating arm carried by said shaft, means adjustably fixing the feeler arm to the gauge operating arm to change the relative angularity of such arms, a gauging mechanism carried by said support including a gauge operating member operated by said gauge operating arm, and means operable to simultaneously move the feeler arm away from the work and move the gauge operating arm away from the gauge operating member.

6. A device of the character described for gauging a rotating workpiece comprising a support adapted for mounting in a position which is fixed with respect to the work axis, a feeler arm having a work engaging portion adjacent one end thereof and yieldingly engageable with the work, means pivotally mounting said arm on said support for movement about an axis parallel to the work axis and so spaced from the work axis that the work engaging portion of the arm moves in a generally radial direction in an arc which substantially meets the work axis, a gauge operating arm, means adjustably fixing the feeler arm to the gauge operating arm to change the relative angularity of such arms, a gauge housing fixed on said support, and gauging mechanism in said housing including a gauge operating member operated by said gauge operating arm and having a fixed path of movement from a limiting position in which it is spaced from the gauge operating arm.

7. A device of the character described for gauging a rotating workpiece comprising a gauge housing, gauge mechanism operably mounted in said housing, a gauge operating plunger projecting from said housing and operating said gauge mechanism, a stationary support on which said gauge housing is fixed, a shaft pivotally mounted in said support and adapted for endwise movement therein, locating means determining an end position of said shaft, means yieldingly holding the shaft against the locating means, a feeler arm carried by and movable with the shaft and having a work engaging portion adjacent one end thereof adapted for yielding engagement with the work and movable about the shaft axis in a direction towards and away from the work center, a gauge operating arm movable with the feeler arm and having a projecting end portion cooperating with said gauge operating member, means for adjusably setting the two arms about the shaft axis with respect to one another, and means for yieldingly urging said arms to move the feeler arm towards the work axis and move the gauge operating arm towards the gauge operating member, said arms being movable against the action of said last named means about the shaft axis and movable in the direction of the shaft axis to separate the feeler arm from the work and separate the gauge operating arm from the gauge operating member.

8. A device of the character described for gauging an external surface of a rotating workpiece comprising a support adapted for mounting in a position which is fixed with respect to the work axis, a feeler arm having a work engaging portion adjacent one end thereof and movable towards the work axis as the size of the workpiece is reduced, means pivotally supporting said arm on said support for movement about an axis parallel to the work axis, a gauge operating arm adjustably fixed to said feeler arm to provide for relative adjustment of said arms about their pivot axis, a gauging mechanism carried by said support including a gauge operating member operated by said gauge operating arm, said gauge operating member being so arranged with respect to the work axis that said arms can be swung on their pivot axis to remove the feeler arm from the work and remove the gauge operating arm from the gauge operating member.

9. A device of the character described for gauging a surface of revolution of a rotating workpiece comprising a support, a gauge controlling part mounted on said support, a feeler arm having a work engaging portion adapted for yielding engagement with the rotating work, means pivotally supporting said arm on said support for movement about an axis parallel to the work axis and so spaced therefrom that the work engaging portion of the arm is movable towards and from the work axis, a second arm adjustably connected to the feeler arm and cooperatively associated with the gauge controlling part, and means operable to simultaneously move said arms parallel to the work axis to retract the feeler arm from the work and to retract the second arm from the gauge controlling part so as to then permit reverse rotation of said second arm past the gauge controlling part to an inoperative position.

10. A device of the character described for gauging an internal surface of revolution of a rotating workpiece comprising a support adapted for mounting in a position which is fixed with respect to the work axis, a feeler arm having a lateral end extension provided with a work engaging portion insertable into the end of the work with the feeler arm extending substantially transversely of the work axis, means pivotally supporting said arm on said support for movement about an axis parallel to the work axis and so spaced therefrom that the work engaging portion of the end extension is movable substantially radially towards and from the work axis, a gauge operating arm adjustably fixed to the feeler arm, gauging mechanism carried by said support and including a gauge operating member operated by said gauge operating arm, and means operable to simultaneously move said arms parallel to the work axis so as to then permit reverse rotation of said gauge operating arm past the gauge operating member to an inoperative position of the arms in which the feeler arm permits the work to be replaced.

11. A device of the character described for gauging an internal surface of revolution of a rotating workpiece comprising a support adapted for mounting in a position which is fixed with respect to the work axis, a feeler arm having a lateral end extension provided with a work engaging portion insertable into the end of the work with the feeler arm extending substantially transversely of the work axis, means pivotally supporting said arm on said support for movement about an axis parallel to the work axis and so spaced therefrom that the work engaging portion of the end extension is movable substantially radially towards and from the work axis, a gauge operating arm adjustably fixed to the feeler arm to assume different angles with respect thereto, said arms being closely adjacent one another, gauging mechanism carried by said support and including a gauge operating member operated by said gauge operating arm, and means operable to simultaneously move said arms rotationally in one direction and then parallel to the work axis so as to then permit reverse rotation of said gauge operating arm past the gauge operating member to an inoperative position of the arms in which the feeler arm permits the work to be replaced.

12. A device of the character described for gauging an internal surface of revolution of a rotating workpiece comprising a support adapted for mounting in fixed position with respect to the axis of the workpiece, gauging mechanism carried by said support, a feeler arm, means pivotally mounting said arm on said support, said arm projecting toward the work axis and having a lateral end extension forming a work engaging portion adapted for yielding engagement with the work, a gauge operating arm movable with the feeler arm and engaging said gauging mechanism, and means operable to simultaneously move said arms parallel to the work axis so as to then permit reverse rotation of said gauge operating arm past its point of engagement with the gauging mechanism to an inoperative position.

13. A device of the character described for gauging a rotating work piece, comprising a support adapted for mounting in a position which is fixed with respect to the work axis, a feeler arm having a work engaging portion adjacent one end thereof, means for yieldingly urging said arm to normally maintain said work engaging portion in yielding engagement with the work, means for mounting said arm on said support for movement axially of the work and for pivotal movement about an axis so spaced from the work axis that said work engaging portion moves in a generally radial direction in an arc which substantially meets the work axis, a second arm, means adjustably fixing the feeler arm to said second arm to change the relative angularity of said arms, and gauging means carried by said support and controlled by said second arm.

WILLIS FAY ALLER.